United States Patent
Morinaga et al.

(10) Patent No.: US 7,864,695 B2
(45) Date of Patent: Jan. 4, 2011

(54) TRAFFIC LOAD DENSITY MEASURING SYSTEM, TRAFFIC LOAD DENSITY MEASURING METHOD, TRANSMITTER, RECEIVER, AND RECORDING MEDIUM

(75) Inventors: Masanobu Morinaga, Kawasaki (JP); Noriyuki Fukuyama, Kawasaki (JP); Hideaki Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1247 days.

(21) Appl. No.: 11/447,193

(22) Filed: Jun. 6, 2006

(65) Prior Publication Data
US 2007/0177520 A1 Aug. 2, 2007

(30) Foreign Application Priority Data
Jan. 30, 2006 (JP) .............................. 2006-021476

(51) Int. Cl.
H04L 12/26 (2006.01)
H04J 1/16 (2006.01)

(52) U.S. Cl. .................... 370/252; 370/235; 370/253

(58) Field of Classification Search ................ 370/218, 370/235, 241–253, 229
See application file for complete search history.

(56) References Cited

U.S. PATENT DOCUMENTS

| | | | | |
|---|---|---|---|---|
| 6,901,051 B1* | 5/2005 | Hou et al. | .................... | 370/231 |
| 7,031,322 B1* | 4/2006 | Matsuo | .................... | 370/395.4 |
| 7,079,486 B2* | 7/2006 | Colavito et al. | ............. | 370/231 |
| 7,567,509 B2* | 7/2009 | Ortiz | .......................... | 370/230 |
| 2002/0075857 A1* | 6/2002 | LeBlanc | .................... | 370/352 |
| 2002/0191573 A1* | 12/2002 | Whitehill et al. | ............ | 370/338 |
| 2003/0004687 A1* | 1/2003 | Seki | .......................... | 702/188 |
| 2003/0016627 A1 | 1/2003 | Melampy et al. | | |
| 2003/0053419 A1 | 3/2003 | Kanazawa et al. | | |
| 2003/0131288 A1* | 7/2003 | Takahashi et al. | ............. | 714/43 |
| 2003/0152094 A1* | 8/2003 | Colavito et al. | ............. | 370/412 |
| 2004/0008627 A1* | 1/2004 | Garg et al. | .................. | 370/235 |

(Continued)

FOREIGN PATENT DOCUMENTS

JP 2003-158550 5/2003

(Continued)

OTHER PUBLICATIONS

Japanese Office Action issued Aug. 31, 2010 in corresponding Japanese Patent Application 2006-021476.

*Primary Examiner*—William Trost, IV
*Assistant Examiner*—Roberta A Shand
(74) *Attorney, Agent, or Firm*—Staas & Halsey LLP

(57) ABSTRACT

The traffic load density measuring system includes a transmitter connected to a communication network for transmitting a packet, and a receiver for receiving the packet, in which a packet for load density detection is transmitted and received to measure a traffic load density within a predetermined transmission interval. The transmitter changes a transmission interval of the packet for load density detection, and adds transmission information capable of specifying a transmission time, a transmission interval, and a transmission number of the packet for load density detection to the packet for load density detection to transmit said packet. The receiver receives the packet for load density detection, extracts the transmission information from the packet for load density detection being received, and measures the load density within the predetermined transmission interval based on the extracted transmission information, and a delay or a lost status of the packet for load density detection.

18 Claims, 12 Drawing Sheets

U.S. PATENT DOCUMENTS

| | | | |
|---|---|---|---|
| 2005/0105471 A1* | 5/2005 | Ido et al. | 370/241 |
| 2005/0132044 A1* | 6/2005 | Guingo et al. | 709/225 |
| 2006/0045138 A1* | 3/2006 | Black et al. | 370/516 |
| 2006/0291473 A1* | 12/2006 | Chase et al. | 370/395.5 |

FOREIGN PATENT DOCUMENTS

| | | |
|---|---|---|
| JP | 2003-244238 | 8/2003 |
| JP | 2004-007339 | 1/2004 |
| JP | 2004-172707 | 6/2004 |
| JP | 2004-297287 | 10/2004 |
| JP | 2005-184471 | 7/2005 |
| JP | 2005-236909 | 9/2005 |

\* cited by examiner

F I G. 1
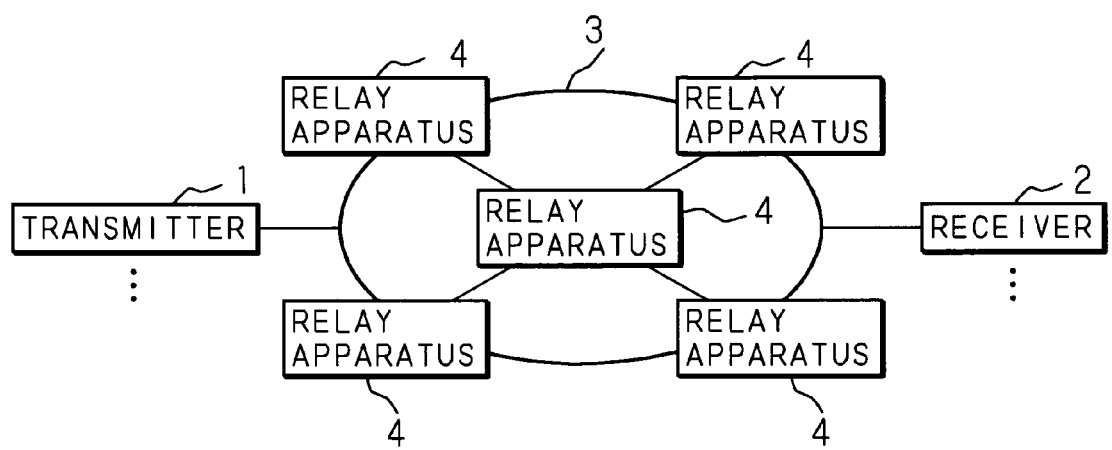

F I G. 6

```
 0                   1                   2                   3
 0 1 2 3 4 5 6 7 8 9 0 1 2 3 4 5 6 7 8 9 0 1 2 3 4 5 6 7 8 9 0 1
```

| V | P | X | CC | M | PT | SQ |
|---|---|---|----|---|----|----|
| timestamp ||||||||
| synchronization source (SSRC) identifiers ||||||||
| contributing source (CSRC) identifiers ||||||||

TRAFFIC LOAD DENSITY MEASURING SYSTEM, TRAFFIC LOAD DENSITY MEASURING METHOD, TRANSMITTER, RECEIVER, AND RECORDING MEDIUM

CROSS-REFERENCE TO RELATED APPLICATIONS

This Nonprovisional application claims priority under 35 U.S.C. §119(a) on Patent Application No. 2006-021476 filed in Japan on Jan. 30, 2006, the entire contents of which are hereby incorporated by reference.

BACKGROUND OF THE INVENTION

The present invention relates to a traffic load density measuring system, a traffic load density measuring method, a transmitter, and a receiver, for measuring a traffic load density regarding a communication network for transmitting a packet, and a recording medium for recording a computer program product for embodying the transmitter or the receiver, and relates particularly to a traffic load density measuring system, a traffic load density measuring method, a transmitter, and a receiver, for measuring a traffic load density in a real-time system, such as a VoIP, a video streaming, or the like, and a recording medium for recording a computer program product for embodying the transmitter or the receiver.

In recent years, use of an application of a real-time system, such as a VoIP (Voice Over Internet Protocol), a video streaming, or the like, which transmits and receives data of a voice, an image, or the like between devices via a communication network, has been increased. When the application of the real-time system is used, quality of playback in reproducing the data of the voice, the image, or the like received using the application is influenced according to the situation of the communication network. For that reason, when the application of the real-time system is newly introduced, if the quality of playback deteriorates during the operation or the like, it is necessary to grasp the situation of the communication network for the purpose of solving the problem.

Conventionally, when transmission characteristics have been measured in a communication network of a packet switching method, such as the Internet or the like, a loss rate and a round trip time of an examination packet for examining a traffic load using a command called Ping have been measured, and the transmission characteristics have been measured based on the measured loss rate and round trip time. In, for example, Japanese Patent Application Laid-Open No. 2003-244238 and Japanese Patent Application Laid-Open No. 2004-007339, there is disclosed a transmission quality measuring method of the so-called passive system which statistically estimates a loss rate, a transfer delay, or the like of the packet of the communication network by capturing all of the packets.

According to the transmission quality measuring method of the passive system described in Japanese Patent Application Laid-Open No. 2003-244238 and Japanese Patent Application Laid-Open No. 2004-007339, however, since all of the packets need to be captured, when a plurality of calls are simultaneously performed, for example, the amount of packets used as an analysis object is significantly increased, so that a highly efficient capturing device is required to deal with the packets. For that reason, there is disclosed in, for example, Japanese Patent Application Laid-Open No. 2003-158550 a transmission quality measuring method of an active system which transmits the examination packet in end-to-end.

In the transmission quality measuring method of the active system, to transmit the examination packet is called a probing. According to the transmission quality measuring method disclosed in Japanese Patent Application Laid-Open No. 2003-158550, it is sufficient to perform the probing for every path between end-to-end bases, so that it is possible to estimate transmission quality without separately providing a highly efficient capturing device.

BRIEF SUMMARY OF THE INVENTION

The present invention aims at providing a traffic load density measuring system, a traffic load density measuring method, a transmitter, a receiver, capable of appropriately indicating a periodic deviation of a traffic load density, namely a varying state of the traffic load density by means of summing traffic states as a distribution, and a recording medium for recording a computer program product for embodying the transmitter or the receiver.

In order to achieve the aforementioned object, a traffic load density measuring system in accordance with a first aspect of the present invention comprises a transmitter connected to a communication network for transmitting a packet, and a receiver connected to the communication network for receiving the packet, in which a packet for load density detection is transmitted and received to measure a traffic load density within a predetermined transmission interval, wherein the transmitter comprises an interval change means for changing a transmission interval of the packet for load density detection, and a transmission means for transmitting the packet with adding transmission information capable of specifying a transmission time, a transmission interval, and a transmission number of the packet for load density detection to the packet for load density detection, and the receiver comprises a reception means for receiving the packet for load density detection, an extraction means for extracting the transmission information from the packet for load density detection being received, and a measurement means for measuring the traffic load density within the predetermined transmission interval based on the extracted transmission information, and a delay or lost status of the packet for load density detection. Note herein that the "packet for load density detection" is a general name of a packet for measuring a deviation of a transmission timing of the packet within a constant interval for a network where the packet, such as a VoIP, is transmitted at a constant time interval (hereafter, this definition is the same).

Moreover, according to a second aspect of the present invention, in the first aspect of the present invention, there is provided the traffic load density measuring system, wherein the interval change means changes the transmission interval of the packet for load density detection so that a ratio of the transmission interval of the packet for load density detection to the predetermined transmission interval may become smaller than an upper limit.

Moreover, according to a third aspect of the present invention, in the first or the second aspect of the present invention, there is provided the traffic load density measuring system, wherein the interval change means adds or subtracts a time randomly generated to or from the predetermined transmission interval to change the transmission interval of the packet for load density detection.

Moreover, according to a fourth aspect of the present invention, there is provided a traffic load density measuring system comprising a transmitter connected to a communication network for transmitting a packet, and a receiver connected to the communication network for receiving the packet, in which a packet for load density detection is transmitted and received to measure a traffic load density within a predetermined transmission interval, wherein the transmitter includes an interval change means for changing a transmission interval of the packet for load density detection, means for storing transmission information capable of specifying a transmission time, a transmission interval, and a transmission number of the packet for load density detection into a data file corresponding to information for specifying the packet for load density detection, and a transmission means for transmitting the packet for load density detection and the data file, and the receiver comprises a reception means for receiving the packet for load density detection and the data file, an extraction means for extracting the transmission information from the data file being received, and a measurement means for measuring the traffic load density within the predetermined transmission interval based on the extracted transmission information, and a delay or lost status of the packet for load density detection.

Moreover, according to a fifth aspect of the present invention, there is provided a traffic load density measuring method using a transmitter connected to a communication network for transmitting a packet, and a receiver for receiving the packet via the communication network, in which a packet for load density detection is transmitted and received to measure a traffic load density within a predetermined transmission interval, wherein the transmitter changes a transmission interval of the packet for load density detection, and transmits the packet with adding transmission information capable of specifying a transmission time, a transmission interval, and a transmission number of the packet for load density detection to the packet for load density detection, and the receiver receives the packet for load density detection, extracts the transmission information from the packet for load density detection being received, and measures the traffic load density within the predetermined transmission interval based on the extracted transmission information, and a delay or a lost status of the packet for load density detection.

Moreover, according to a sixth aspect of the present invention, there is provided a transmitter, in which the transmitter is connected to a communication network, and transmits a packet for load density detection for measuring a traffic load density within a predetermined transmission interval to a receiver, wherein the transmitter comprises an interval change means for changing a transmission interval of the packet for load density detection, and a transmission means for adding transmission information capable of specifying a transmission time, a transmission interval, and a transmission number of the packet for load density detection to the packet for load density detection to transmit the packet.

Moreover, according to a seventh aspect of the present invention, there is provided a receiver, in which the receiver is connected to a communication network and receives a packet for load density detection for measuring a traffic load density within a predetermined transmission interval from a transmitter, wherein the receiver comprises a reception means for receiving the packet for load density detection that includes transmission information capable of specifying a transmission time, a transmission interval, and a transmission number, an extraction means for extracting the transmission information from the packet for load density detection being received, and a measurement means for measuring the traffic load density within the predetermined transmission interval based on the extracted transmission information, and a delay or lost status of the packet for load density detection.

Moreover, according to an eighth aspect of the present invention, there is provided a recording medium storing a computer program product executable in a transmitter which is connected to a communication network, and transmits a packet for load density detection for measuring a traffic load density within a predetermined transmission interval to a receiver, wherein the computer program product causes the transmitter to function as an interval change means for changing a transmission interval of the packet for load density detection, and a transmission means for transmitting the packet with adding transmission information capable of specifying a transmission time, a transmission interval, and a transmission number of the packet for load density detection to the packet for load density detection.

Moreover, according to a ninth aspect of the present invention, there is provided a recording medium storing a computer program product executable in a receiver which is connected to a communication network, and receives a packet for load density detection for measuring a traffic load density within a predetermined transmission interval from a transmitter, wherein the computer program product causes the receiver to function as a reception means for receiving the packet for load density detection that includes transmission information capable of specifying a transmission time, a transmission interval, and a transmission number, an extraction means for extracting the transmission information from the packet for load density detection being received, and a measurement means for measuring the traffic load density within the predetermined transmission interval based on the extracted transmission information, and a delay or lost status of the packet for load density detection.

The traffic load density measuring system in accordance with the first, and the fifth through the ninth aspects of the present invention comprises the transmitter connected to the communication network for transmitting the packet, and the receiver for receiving the packet via the communication network, wherein the packet for load density detection is transmitted and received to measure the traffic load density within the predetermined transmission interval. The transmitter changes the transmission interval of the packet for load density detection, and adds the transmission information capable of specifying the transmission time, the transmission interval, and the transmission number of the packet for load density detection to the packet for load density detection to transmit the packet. The receiver receives the packet for load density detection, extracts the transmission information from the packet for load density detection being received, and measures the traffic load density within the predetermined transmission interval based on the extracted transmission information, and a delay or a lost status of the packet for load density detection. As a result of this, as for the periodic deviation which is present in the traffic load, by changing the transmission interval of the packet for load density detection of probing within a one-time probing, an index value for indicating the traffic load can be measured at a plurality of points within the transmission interval of the VoIP packet by the one-time probing. For this reason, it is not necessary to additionally provide an expensive capturing device, and the amount of traffic required for measuring the traffic load density is almost the same as, for example, one VoIP call, so that a significant reduction in amount of traffic can be achieved as compared with the conventional method which requires a plurality of probings.

In the second aspect of the present invention, the transmission interval of the packet for load density detection is changed so that a ratio of the transmission interval of the packet for load density detection to the predetermined transmission interval may become smaller than an upper limit. As a result of this, the transmission interval of the packet for traffic load density detection is set longer or shorter than the predetermined transmission interval, for example, the transmission interval of the VoIP packet, so that the traffic load can be measured at a plurality of times within the transmission interval of the VoIP packet by a one-time probing, thus allowing the traffic load density to be estimated at any arbitrary points within the transmission interval of the VoIP packet.

In the third aspect of the present invention, the time generated from the random number is added to or subtracted from the predetermined transmission interval to change the transmission interval of the packet for load density detection. As a result of this, the random number is generated so that the transmission interval of the packet for traffic load density detection may be set longer or shorter than the predetermined transmission interval, for example, the transmission interval of the VoIP packet, and hence the traffic load can be measured at a plurality of times within the transmission interval of the VoIP packet by a one-time probing, thus allowing the traffic load density to be estimated at any arbitrary points within the transmission interval of the VoIP packet.

In the fourth aspect of the present invention, the traffic load density measuring system comprises the transmitter connected to the communication network for transmitting the packet, and the receiver connected to the communication network for receiving the packet, wherein the packet for load density detection is transmitted and received to measure the traffic load density within the predetermined transmission interval. The transmitter changes the transmission interval of the packet for load density detection, stores the transmission information capable of specifying the transmission time, the transmission interval, and the transmission number of the packet for load density detection into the data file associating with information for specifying the packet for load density detection, and transmits the packet for load density detection and the data file. The receiver receives the packet for load density detection and the data file, extracts the transmission information from the data file being received, and measures the traffic load density within the predetermined transmission interval based on the extracted transmission information, and a delay or a lost status of the packet for load density detection. As a result of this, as for the periodic deviation which is present in the traffic load, by changing the transmission interval of the packet for load density detection of the probing within a one-time probing, an index value for indicating the traffic load can be measured at a plurality of points within the transmission interval of the VoIP packet by the one-time probing. For this reason, it is not necessary to additionally provide an expensive capturing device, and the amount of traffic required for measuring the traffic load density is almost the same as, for example, one VoIP call, so that a significant reduction in amount of traffic can be achieved as compared with the conventional method which requires a plurality of probings.

According to the first, and the fifth through the ninth aspects of the present invention, as for the periodic deviation which is present in the traffic load, by changing the transmission interval of the packet for load density detection of probing within a one-time probing, an index value for indicating the traffic load can be measured at a plurality of points within the transmission interval of the VoIP packet by the one-time probing. For this reason, it is not necessary to additionally provide an expensive capturing device, and the amount of traffic required for measuring the traffic load density is almost the same as, for example, one VoIP call, so that a significant reduction in amount of traffic can be achieved as compared with the conventional method which requires a plurality of probings.

According to the second aspect of the present invention, the transmission interval of the packet for traffic load density detection is set longer or shorter than the predetermined transmission interval, for example, the transmission interval of the VoIP packet, and hence the traffic load can be measured at a plurality of times within the transmission interval of the VoIP packet by the one-time probing, thus allowing the traffic load density to be estimated at any arbitrary points within the transmission interval of the VoIP packet.

According to the third aspect of the present invention, the random number is generated so that the transmission interval of the packet for traffic load density detection may be set longer or shorter than the predetermined transmission interval, for example, the transmission interval of the VoIP packet, and hence the traffic load can be measured at a plurality of times within the transmission interval of the VoIP packet by the one time probe, thus allowing the traffic load density to be estimated at any arbitrary points within the transmission interval of the VoIP packet.

According to the fourth aspect of the present invention, as a result of this, as for the periodic deviation which is present in the traffic load, by changing the transmission interval of the packet for load density detection of probing within a one-time probing, an index value for indicating the traffic load can be measured at a plurality of points within the transmission interval of the VoIP packet by the one-time probing. For this reason, it is not necessary to additionally provide an expensive capturing device, and the amount of traffic required for measuring the traffic load density is almost the same as, for example, one VoIP call, so that a significant reduction in amount of traffic can be achieved as compared with the conventional method which requires a plurality of probings.

The above and further objects and features of the invention will more fully be apparent from the following detailed description with accompanying drawings.

BRIEF DESCRIPTION OF THE SEVERAL VIEWS OF THE DRAWINGS

FIG. 1 is a block diagram illustrating a configuration of a traffic load density measuring system in accordance with a first embodiment of the present invention;

FIG. 6 is an exemplary view illustrating a packet header configuration specified by RTP;

DETAILED DESCRIPTION OF THE INVENTION

Figure 2:
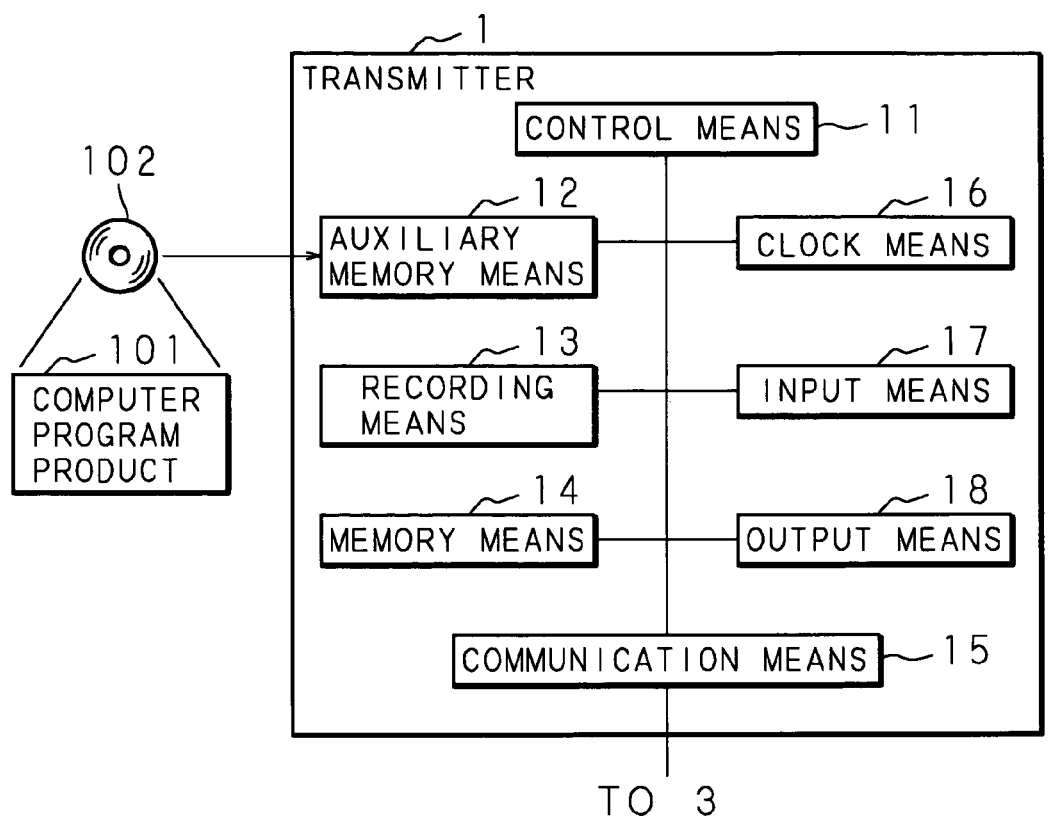
FIG. 2 is a block diagram illustrating a configuration of a transmitter for use in the traffic load density measuring system in accordance with the first embodiment of the present invention.

In the applications of a real-time system, such as the aforementioned VoIP, video streaming, or the like, a voice data, an image data, or the like to be transmitted is divided into units each having a predetermined size, and data divided in the units are transmitted for every predetermined time interval (for example, 20 ms). For this reason, when data transmission timings of a plurality of terminal devices have been coincident with each other, a periodic deviation has been present in the traffic load even in the transmission using the same communication network at the same time, so that there has been a problem that variability in transmission quality, for example conversational quality, might arise. According to the transmission quality measuring method disclosed in Japanese Patent Application Laid-Open No. 2003-244238, all of the packets are captured, and hence it is possible to eventually determine whether or not the variability in conversational quality occurs. However, a high processing capability is required for the purpose of analyzing a large number of packets.

Additionally, according to the transmission quality measuring method disclosed in Japanese Patent Application Laid-Open No. 2004-007339, the traffic load may be acquired as an average value. However, it only works out the average traffic load, while a temporal change of the traffic load cannot be detected.

Further, according to the transmission quality measuring method disclosed in Japanese Patent Application Laid-Open No. 2003-158550, a plurality of probings in which the transmission timing of the examination packet is changed for every transmission are performed at the same interval as, for example, the transmission interval of the VoIP packet, thus allowing the measurement of the traffic density. In other words, since a one-time probing has allowed only one point measurement within the transmission interval of the VoIP packet, when there has been a deviation of the traffic load within the transmission interval of the VoIP packet, there has been a problem that the deviation of the traffic load has not been measured.

The present invention is made in view of the situation described above, and aims at providing a traffic load density measuring system, a traffic load density measuring method, a transmitter, and a receiver, capable of appropriately indicating periodic deviation of a traffic load density, namely a varying state of the traffic load density, by means of summing traffic states as a distribution, and a computer program product used for the transmitter or the receiver, where the object of the present invention is realized by means of embodiments described hereinafter.

First Embodiment

FIG. 1 is a block diagram illustrating a configuration of a traffic load density measuring system in accordance with a first embodiment of the present invention. In FIG. 1, a transmitter 1 evaluates transmission (conversational) quality by means of measuring a traffic load density of a communication network 3, such as the Internet or the like. A plurality of transmitters 1, 1, ... using computers that deliver stream data of a moving image, a voice, or the like, and receivers 2, 2, ... for receiving the stream data transmitted from the transmitters 1, 1, ... are connected to the communication network 3. The communication network 3 is provided with a plurality of relay apparatuses 4, 4, ... such as the Internet router or the like, where a packet is transmitted from the transmitters 1, 1, ... to the receivers 2, 2, ... through a communication path composed of the unspecified relay apparatuses 4, 4, ....

FIG. 2 is a block diagram illustrating a configuration of the transmitter 1 for used in the traffic load density measuring system in accordance with the first embodiment of the present invention. The transmitter 1 is provided with a control means 11, such as a CPU for controlling the whole device, an auxiliary storage means 12, such as a CD-ROM drive or the like for reading various information from a recording media 102, such as a CD-ROM or the like which records various information, such as a computer program product 101 executable on the transmitter 1 in accordance with the first embodiment of the present invention, data, and the like, and a recording means 13, such as a hard disk for recording the various information read by the auxiliary memory means 12. By reading the various information such as the computer program product 101 in accordance with the present invention, the data, and the like from the recording means 13, and causing a storage means 14, such as a RAM or the like for temporarily storing information to store the various information to thereby cause the control means 11 to execute various procedures included in the computer program product 101, the computer operates as the transmitter 1 in accordance with the present invention. The transmitter 1 is further provided with a communication means 15 for transmitting a packet, a clock means 16 for acquiring a time, an input means 17, such as a mouse, a keyboard, or the like, and an output means 18, such as a monitor, a printer, or the like.

Figure 3:
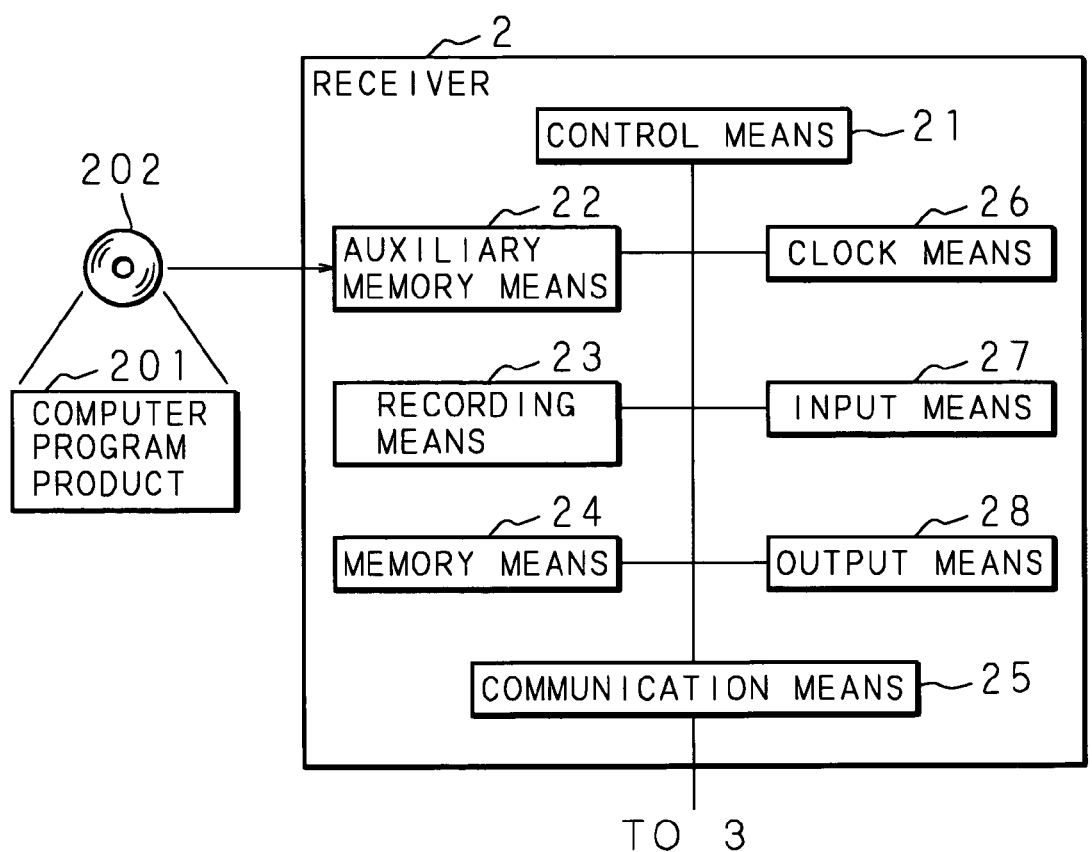
FIG. 3 is a block diagram illustrating a configuration of a receiver for use in the traffic load density measuring system in accordance with the first embodiment of the present invention.

FIG. 3 is a block diagram illustrating a configuration of the receiver 2 for use in the traffic load density measuring system in accordance with the first embodiment of the present invention. The receiver 2 is provided with a control means 21, such as a CPU for controlling the whole device, an auxiliary storage means 22, such as a CD-ROM drive or the like for reading various information from a recording media 202, such as a CD-ROM or the like which records various information, such as a computer program product 201 executable on the receiver 2 in accordance with the first embodiment of the present invention, data, and the like, and a recording means 23, such as a hard disk or the like for recording the various information read by the auxiliary memory means 22. By reading the various information such as the computer program product 201 in accordance with the present invention, the data, and the like from the recording means 23, and causing a storage means 24, such as a RAM or the like for temporarily storing information to store the various information to thereby cause the control means 21 to execute various procedures included in the computer program product 201, the computer operates as the receiver 2 in accordance with the present invention. The receiver 2 is further provided with a communication means 25 for receiving a packet, a clock means 26 for indicating a time, an input means 27, such as a mouse, a keyboard, or the like, and an output means 28, such as a monitor, a printer, or the like.

Figure 4:
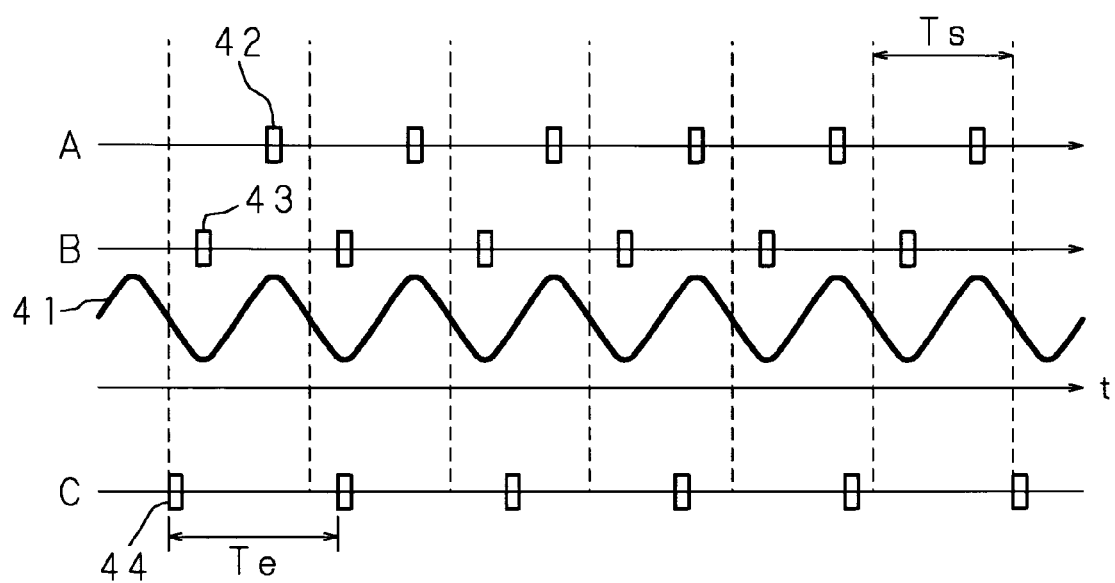
FIG. 4 is a timing chart illustrating a packet transmission timing in a traffic load density measuring method in accordance with the first embodiment of the present invention.

A method of measuring the traffic load density using the transmitter 1 and the receiver 2 of the aforementioned configuration will be described. FIG. 4 is a timing chart illustrating a packet transmission timing in the traffic load density measuring method in accordance with the first embodiment of the present invention. In, for example, the first embodiment, a periodic deviation is present in a traffic load 41. In this example, a cycle of the deviation in the traffic load 41 is the same as a transmission interval of a VoIP packet Ts, for example, 20 ms.

In this state, for example, in a call A, a VoIP packet (voice packet) 42 is always transmitted at a timing of a latter half of the transmission interval Ts of the VoIP packet. For this reason, the call A always transmits the VoIP packet 42 at the timing of heavy communication traffic, so that there is a high possibility that the VoIP packet 42 may be delayed, or the VoIP packet 42 may be lost, resulting in a decrease in conversational quality.

Meanwhile, in, for example a call B, a VoIP packet (voice packet) 43 is always transmitted at a timing of a first half of the transmission interval Ts of the VoIP packet. For this reason, the call B always transmits the VoIP packet 43 at the timing of light communication traffic, so that there is a low possibility that the VoIP packet 43 may be delayed, or the VoIP packet 43 may be lost, resulting in an increase in conversational quality.

As a result, since the conversational quality can be increased by controlling the VoIP packet to be sent at the timing of light communication traffic like call B, the transmitter 1 measures the distribution how the periodic deviation of the traffic load 41 is distributed, by transmitting a packet 44 for traffic load density detection.

Specifically, the transmitter 1 transmits the packet 44 for traffic load density detection at a timing shown by symbol C. In other words, as can be seen from FIG. 4, symbol C represents a transmission timing of a probing signal, and the packet 44 for load density detection is transmitted at the transmission interval Te a little longer than the transmission interval Ts of the VoIP packet. Thus, while the packet 44 for traffic load density detection is transmitted at the timing of the first half of the transmission interval Ts of the VoIP packet, the transmission timing changes such that the packet 44 for traffic load density detection will be transmitted at the timing of the latter half of the transmission interval Ts of the VoIP packet one after another. Hence, one transmission of the probing signal allows the packet 44 for load density detection to be transmitted at any timings of the transmission interval Ts of the VoIP packet.

Figure 5:
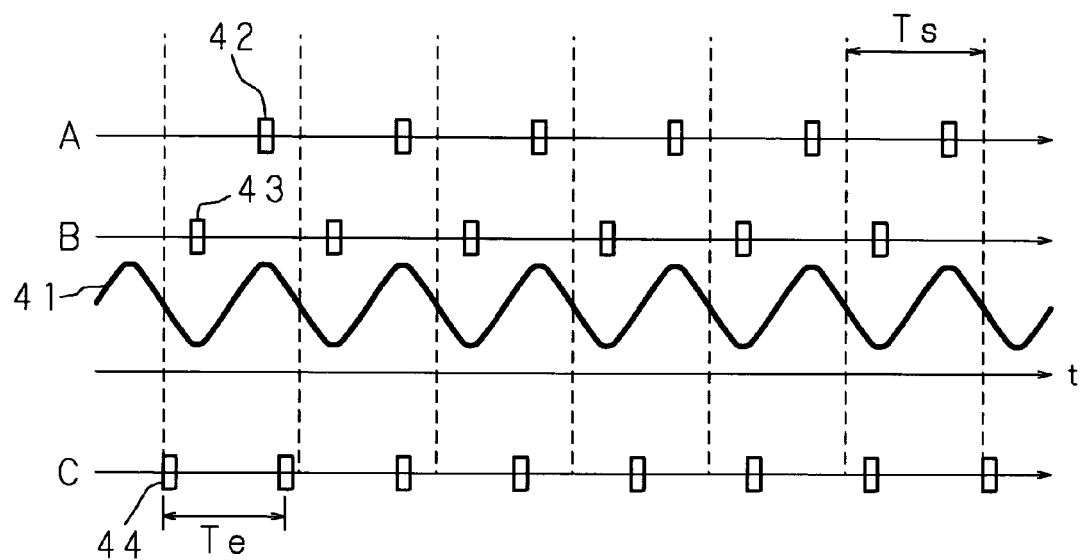
FIG. 5 is a timing chart illustrating a packet transmission timing upon transmitting a packet for load density detection at a transmission interval Te shorter than a transmission interval Ts of a VoIP packet.

As a matter of course, the packet 44 for traffic load density detection may be transmitted at the transmission interval Te shorter than the transmission interval Ts of the VoIP packet. FIG. 5 is a timing chart illustrating a packet transmission timing upon transmitting the packet 44 for traffic load density detection at a transmission interval Te shorter than the transmission interval Ts of the VoIP packet.

In FIG. 5, the packet 44 for traffic load density detection is transmitted at the transmission interval Te shorter than the transmission interval Ts of the VoIP packet. Also in this case, the packet 44 for load density detection is first transmitted at the timing of the first half of the transmission interval Ts of the VoIP packet, and the transmission timing changes such that the packet 44 for load density detection will be transmitted at the timing of the latter half of the transmission interval Ts of the VoIP packet one after another. Hence, one transmission of the probing signal allows the packet 44 for load density detection to be transmitted at any timings of the transmission interval Ts of the VoIP packet.

As the packet for load density detection transmitted from the transmitter 1 to the receiver 2, a packet specified by a communication protocol for transmitting a voice and a moving image in real time, such as RTP, is used.

FIG. 6 is an exemplary view illustrating a packet header configuration specified by RTP. In the case of RTP, header information is included in a data portion of the IP packet, and various information regarding the packet specified by RTP are written therein. Hereinafter, meaning of the information written in the header will be described.

Symbol V (Version) represents a version of RTP. Symbol P (padding) represents the presence of padding data for adjusting a packet size. Symbol X (Extension) represents the presence of an extended header. Symbol CC (Contributing Source Identifier Count) represents the number of CSRC(s) for indicating a stream source. Symbol M (Marker) has various usages according to the applications of the packet, when the data is, for example, an image, it represents a boundary between picture frames. Symbol PT (Payload Type) represents a payload type which is a coding system (CODEC) of application data. Symbol SQ (sequence number) represents a sequence number, and is a natural number for indicating an order of the packet. Timestamp represents a time stamp and a time is written therein. Synchronization source (SSRC) identifier represents a SSRC identifier used for identification of a transmission source, and is used in combining the voice and the image from the same transmitter at the receiver side. Contributing source (CSRC) identifier represents a CSRC identifier used for identification of a host computer to be the stream source.

Formats and contents other than RTP may be used for the packet for load density detection, and even when other formats or the contents are used, what is necessary is just to acquire contents required for measurement of transmission characteristics, from a predetermined location in the packet.

Figure 7:
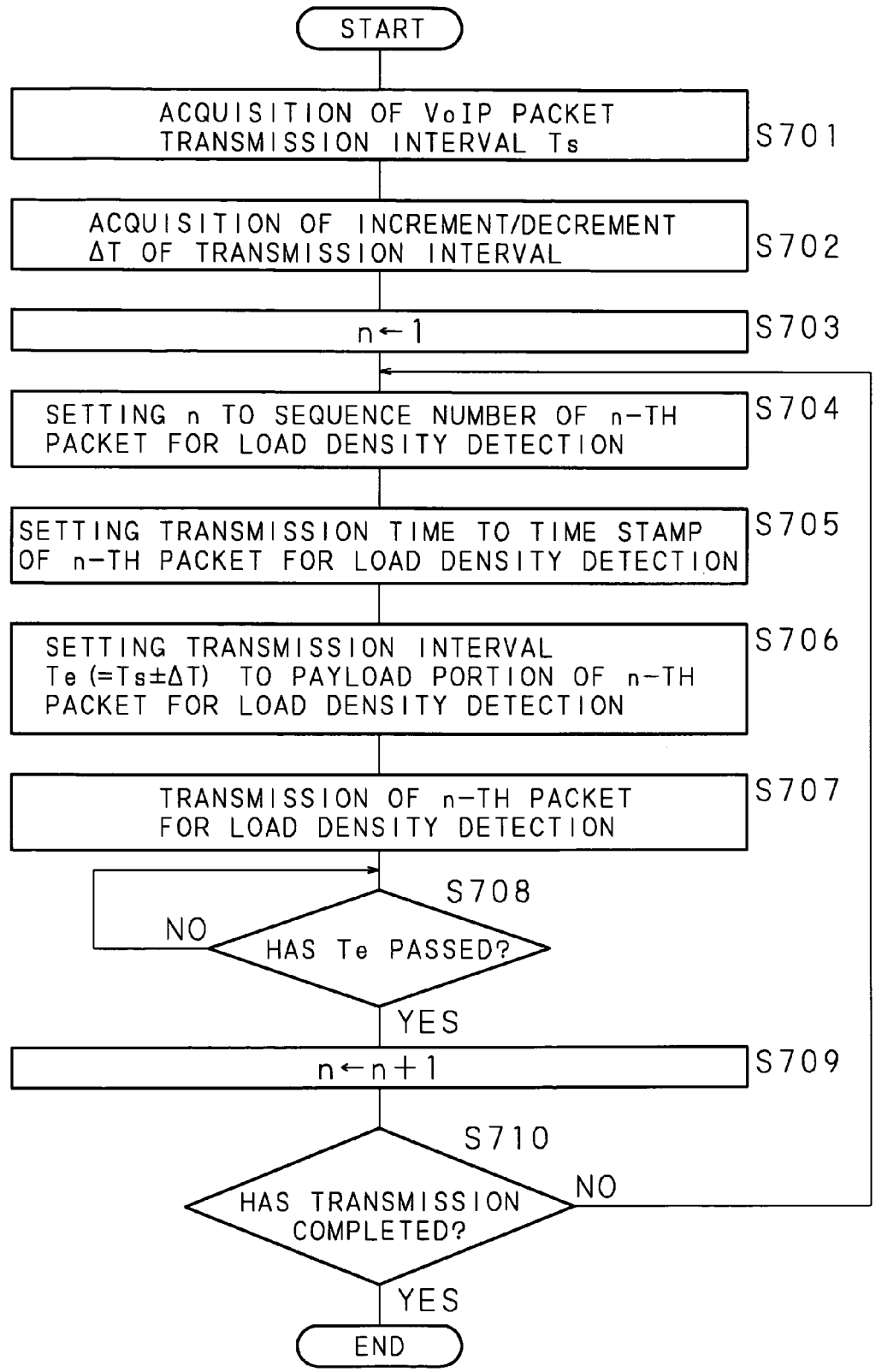
FIG. 7 is a flow chart illustrating a procedure of a control means of the transmitter for use in the traffic load density measuring system in accordance with the first embodiment of the present invention.

FIG. 7 is a flow chart illustrating a procedure of the control means 11 of the transmitter 1 for use in the traffic load density measuring system in accordance with the first embodiment of the present invention. First, the control means 11 of the transmitter 1 acquires the transmission interval Ts of the VoIP packet (Step S701). The transmission interval Ts of the VoIP packet may be received via the input means 17 of the transmitter 1, or may be received via the communication means 15 from an external apparatus.

The control means 11 acquires an increment or decrement $\Delta T$ of the transmission interval Ts of the VoIP packet (Step S702). The increment or decrement $\Delta T$ of the transmission interval Ts of the VoIP packet may be received via the input means 17 of the transmitter 1, or may be received via the communication means 15 from an external apparatus. The control means 11 sets the sequence number n (n is a natural number) of the packet for load density detection to an initial value "1" (Step S703). Note herein that, as an example of a simple value calculation method for increasing measurement accuracy, the increment or decrement $\Delta T$ of the transmission interval Ts of the VoIP packet may be a constant ratio of the transmission interval Ts of the VoIP packet, for example, the $\Delta T$ is preferable to be equal to or less than $1/10$ of the transmission interval Ts of the VoIP packet. In other words, the transmission interval Te of the packet for load density detection is set within a range given by the following formula, $$0.9*Ts \leq Te \leq 1.1*Ts$$

so that it certainly becomes possible to detect the traffic load in at least ten sampling points or more within the transmission interval Ts of the VoIP packet.

The control means 11 sets the sequence number n to a header item SQ of an n-th packet for load density detection (Step S704), and sets a transmission time to a time stamp of a header item of the n-th packet for load density detection (Step S705). The control means 11 also sets the transmission interval Te to a payload portion of the n-th packet for load density detection (Step S706). The transmission interval Te of the packet for load density detection may be calculated by adding or subtracting ΔT to or from the transmission interval Ts of the VoIP packet.

The control means 11 transmits the n-th packet for load density detection to the receiver 2 (Step S707) to determine whether or not the transmission interval Te has passed (Step S708). If the control means 11 determines that the transmission interval Te has not passed yet (Step S708: NO), the control means 11 will be in a standby state until the transmission interval Te has passed. If the control means 11 determines that the transmission interval Te has passed (Step S708: YES), the control means 11 increments the sequence number n by "1" (Step S709), and determines whether or not the transmission of the packet for load density detection has been completed (Step S710).

If the control means 11 determines that the transmission of the packet for load density detection has not been completed yet (Step S710: NO), the control means 11 returns the procedure to Step S704 to repeat the aforementioned procedure. If the control means 11 determines that the transmission of the packet for load density detection has been completed (Step S710: YES), the control means 11 stops the transmission of the packet for load density detection to complete the procedure.

Figure 8:
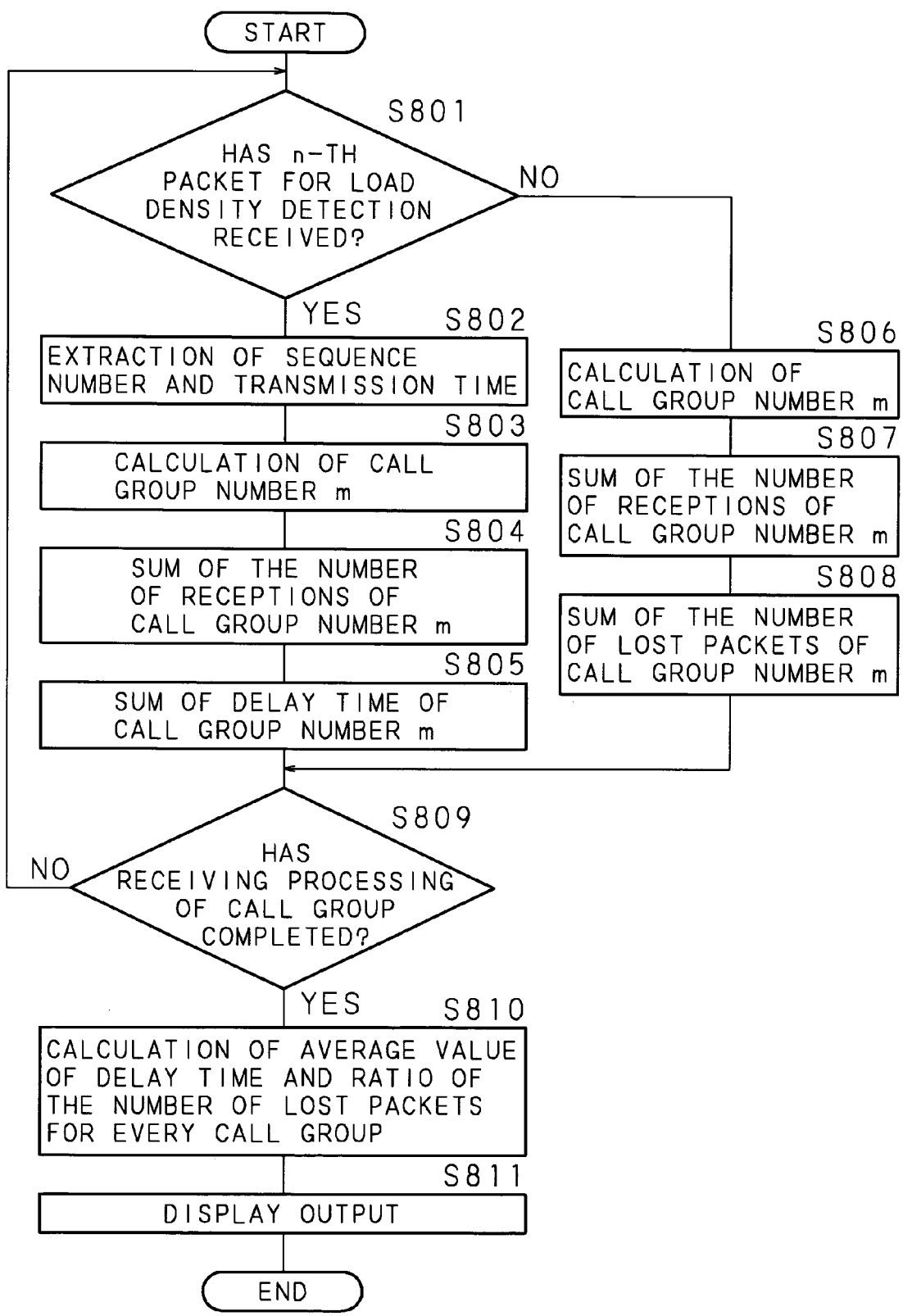
FIG. 8 is a flow chart illustrating a procedure of a control means of the receiver for use in the traffic load density measuring system in accordance with the first embodiment of the present invention.

The receiver 2, by determining whether or not the packet 44 for traffic load density detection transmitted at the aforementioned timing is greatly delayed, or is received without being lost, can determine the amount of the communication traffic at the transmission timing. FIG. 8 is a flow chart illustrating a procedure of the control means 21 of the receiver 2 for use in the traffic load density measuring system in accordance with the first embodiment of the present invention.

The control means 21 of the receiver 2 determines whether or not the n-th packet for load density detection has been received (Step S801). If the control means 21 determines that the n-th packet for load density detection has been received (Step S801:YES), the control means 21 extracts the sequence number and the transmission time from the header information of the packet for load density detection being received (Step S802).

The control means 21 calculates a call group number m (m is a natural number) (Step S803). Here, the call group means what number of the time interval it is when the time interval of the transmission interval Ts of the VoIP packet is equally divided by M (M is a natural number), and the call group number is a number m (m is a natural number: m≦M) which indicates a sampling position that belongs to the number of the call groups when the load density detection of a plurality of points in the transmission interval Ts of the VoIP packet is performed by the probing. The call group number m is worked out as an integral part of the remainder obtained by dividing a difference between a time stamp TS (n) of the header item of the n-th packet for load density detection, and an initial value TS (1) by the transmission interval Ts of the VoIP packet. That is, it is calculated based on equation (1). Note herein that, in equation (1), TS(n) represents the transmission time extracted from the header information of the n-th packet for load density detection being received, INT(*) represents a function to calculate the integral part of the calculated value inside the parentheses, and MOD(x, y) represents a function to calculate the remainder obtained by dividing x by y, respectively.

$$m=\text{INT}(\text{MOD}(TS(n)-TS(1),Ts)) \qquad \text{Equation (1)}$$

The control means 21 sums the number of receptions of the call group number m (Step S804), and sums the delay time of the call group number m (Step S805). The delay time is calculated as a relative delay time of the reception time with respect to the extracted transmission time.

If the control means 21 determines that the n-th packet for load density detection has not been received yet (Step S801: NO), the control means 21 calculates the call group number m (m is a natural number) (Step S806). Since a value of the time stamp TS of the header item of the n-th packet for load density detection can not be extracted, the call group number m is worked out as an integral part of the remainder obtained by dividing a difference between a value obtained by adding k times of the transmission interval of the VoIP packet Te to TS (n-k), and the initial value TS (1) by the transmission interval Ts of the packet for load density detection using TS (n-k) of a newest (n-k)th packet for load density detection among the packets for load density detection that have been received in the past. That is, it is calculated based on equation (2).

$$m=\text{INT}(\text{MOD}(TS(n-k)+Te^*k-TS(1),Ts)) \qquad \text{Equation (2)}$$

The control means 21 sums the number of receptions of the call group number m (Step S807), and sums the number of lost packets of the call group number m (Step S808).

The control means 21 determines whether or not the receiving processing of the packet for load density detection of the number of receptions being sufficient for evaluating quality for every call group, for example, 500 receptions has been completed (Step S809). If the control means 21 determines that the receiving processing of the packet for load density detection has not been completed yet (Step S809: NO), the control means 21 returns the procedure to Step S801 to repeat the aforementioned procedure. If the control means 21 determines that the receiving processing of the packet for load density detection has been completed (Step S809: YES), the control means 21 calculates an average value of the delay time, and a ratio of the number of lost packets for every call group (Step S810), and outputs and displays the calculated result through the output means 18 (Step S811).

Figure 9:
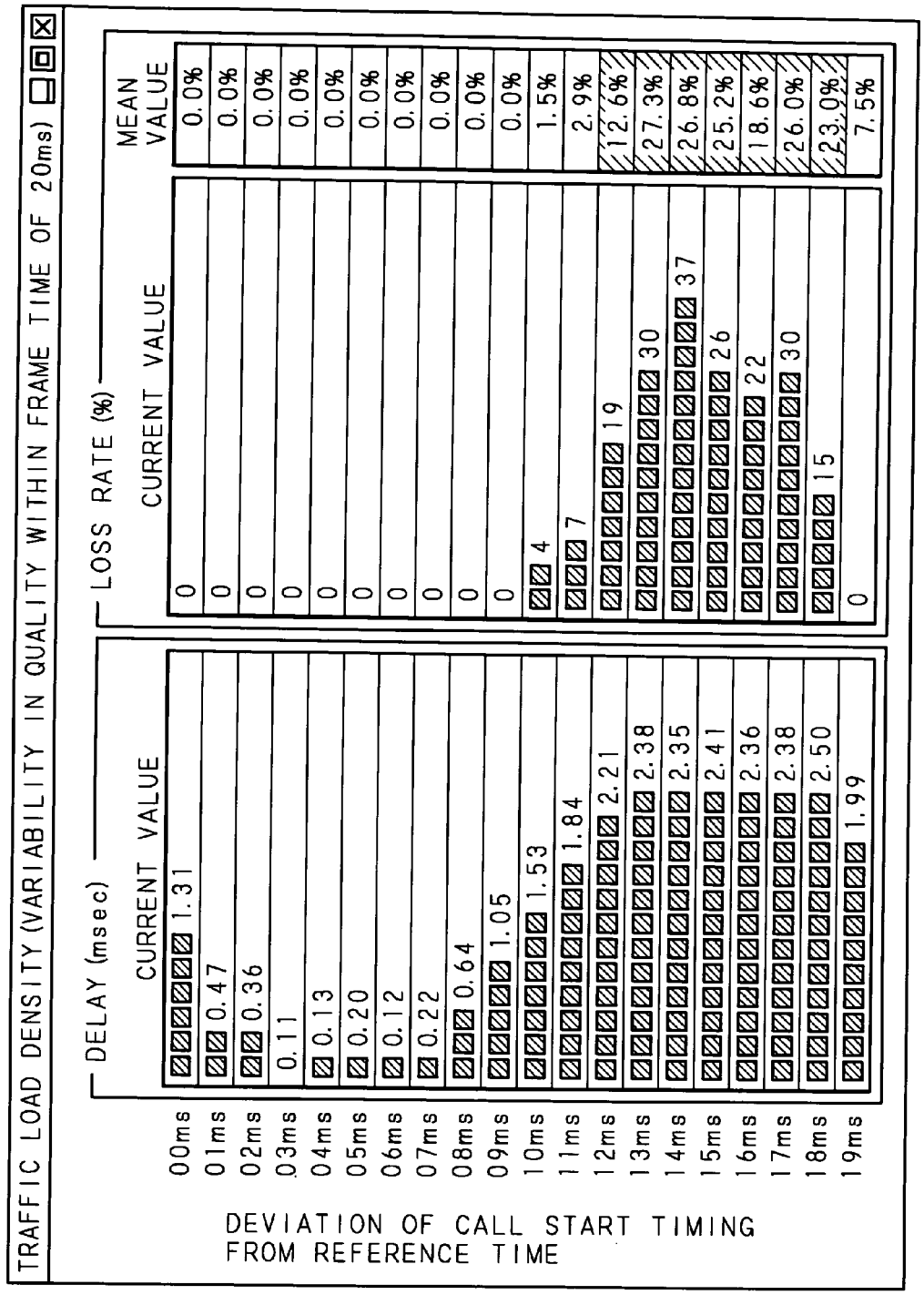
FIG. 9 is an exemplary view illustrating a display screen of an analyzed result displayed on an output means of the receiver.

The average value of the delay time for every call group is calculated as a value obtained by dividing the delay time summed for every call group by the summed number of receptions. Moreover, the ratio of the number of lost packets for every call group is calculated as a value obtained by dividing the number of lost packets summed for every call group by a sum of the summed number of lost packets and the summed number of receptions. The average value of the delay time and the ratio of the number of lost packets which have been calculated are outputted and displayed through the output means 18, such as a display unit or the like. FIG. 9 is an exemplary view illustrating a display screen of an analyzed result displayed on the output means 18 of the receiver 2.

As shown in FIG. 9, the variation of the average value of the delay time, and the loss rate of the packet at 20 ms which is the transmission interval Ts of the VoIP packet are graphically displayed thereon. Thus, it is possible to visually grasp the distribution of the traffic load within the transmission interval TS of the VoIP packet.

As a matter of course, the output means 18 is not limited to the screen display on the display unit, but may be a printout by a printer, or may be transmitted to the transmitter 1 as a data file.

Incidentally, the transmission interval of the packet for load density detection is not added to the header information, the payload, or the like of the packet for load density detection as described above, but the transmission interval of the packet for load density detection may be manually set only once in the transmitter 1 and the receiver 2 via the input means 17 before the measurement start.

As described above, according to the first embodiment, it is not necessary to additionally provide an expensive capturing device, and the communication traffic required for measuring the traffic load density is almost the same as, for example, one VoIP call, so that a significant reduction in communication traffic can be achieved as compared with the conventional method which requires a plurality of probings.

Second Embodiment

Hereafter, a traffic load density measuring system in accordance with a second embodiment of the present invention will be described with reference to the drawings. Since a configuration of the traffic load density measuring system in accordance with the second embodiment is similar to that of the first embodiment, detailed description will be omitted by giving the same reference numeral. The second embodiment is different from the first embodiment in that a range of increasing or decreasing the transmission interval of the packet for load density detection is changed by generating a random number. Note herein that, also in the second embodiment, the deviation cycle of the traffic load, namely, the transmission interval Ts of the VoIP packet is assumed to be 20 ms like the first embodiment.

Figure 10:
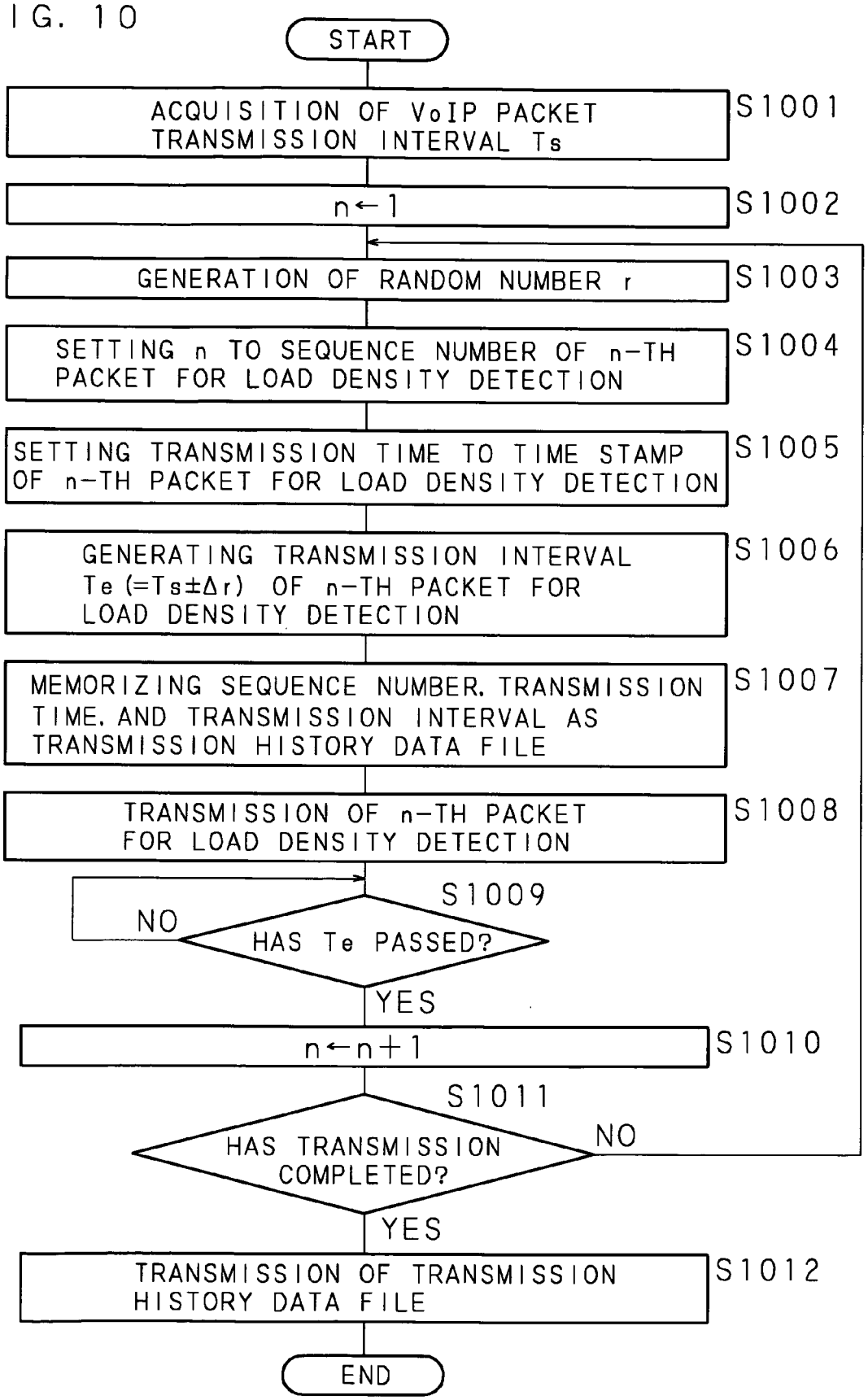
FIG. 10 is a flow chart illustrating a procedure of a control means of a transmitter for use in a traffic load density measuring system in accordance with the second embodiment of the present invention.

FIG. 10 is a flow chart illustrating a procedure of the control means 11 of the transmitter 1 for use in the traffic load density measuring system in accordance with the second embodiment of the present invention. First, the control means 11 of the transmitter 1 acquires the transmission interval Ts of the VoIP packet (Step S1001). The transmission interval Ts of the VoIP packet may be received via the input means 17 of the transmitter 1, or may be received via the communication means 15 from an external apparatus.

The control means 11 sets the sequence number n (n is a natural number) of the packet for load density detection to the initial value "1" (Step S1002), and generates a random number r for calculating an increment or decrement ΔT to the transmission interval Ts of the VoIP packet (Step S1003). A generation method of the random number r is not particularly limited, and any numbers may be used as far as it is a well-known random number generation method. Incidentally, by setting a range of the random number r to be generated as follows $$0 \leq r \leq \Delta T$$

at the sampling points of the appropriate number within the transmission interval Ts of the VoIP packet, it becomes possible to detect the traffic load everywhere.

The control means 11 sets the sequence number n to the header item SQ of the n-th packet for load density detection (Step S1004), and sets the transmission time to the time stamp of the header item of the n-th packet for load density detection (Step S1005). The control means 11 generates the transmission interval Te of the n-th packet for load density detection (Step S1006), and causes the storage means 14 to store the sequence number, the transmission time, and the transmission interval Te as a transmission history data file for storing packet reception history information (Step S1007). The transmission interval Te of the packet for load density detection may be calculated by adding or subtracting the random number r to or from the transmission interval Ts of the VoIP packet.

The control means 11 transmits the n-th packet for load density detection to the receiver 2 (Step S1008) to determine whether or not the transmission interval Te has passed (Step S1009). If the control means 11 determines that the transmission interval Te has not passed yet (Step S1009: NO), the control means 11 will be in a standby state until the transmission interval Te has passed. If the control means 11 determines that the transmission interval Te has passed (Step S1009: YES), the control means 11 increments the sequence number n by "1" (Step S1010), and determines whether or not the transmission of the packet for load density detection has been completed (Step S1011).

If the control means 11 determines that transmission of the packet for load density detection has not been completed yet (Step S1011: NO), the control means 11 returns the procedure to Step S1003 to repeat the aforementioned procedure. If the control means 11 determines that transmission of the packet for load density detection has been completed (Step S1011: YES), the control means 11 stops transmission of the packet for load density detection, transmits the transmission history data file to the receiver 2 (Step S1012), and then completes the procedure.

Figure 11:
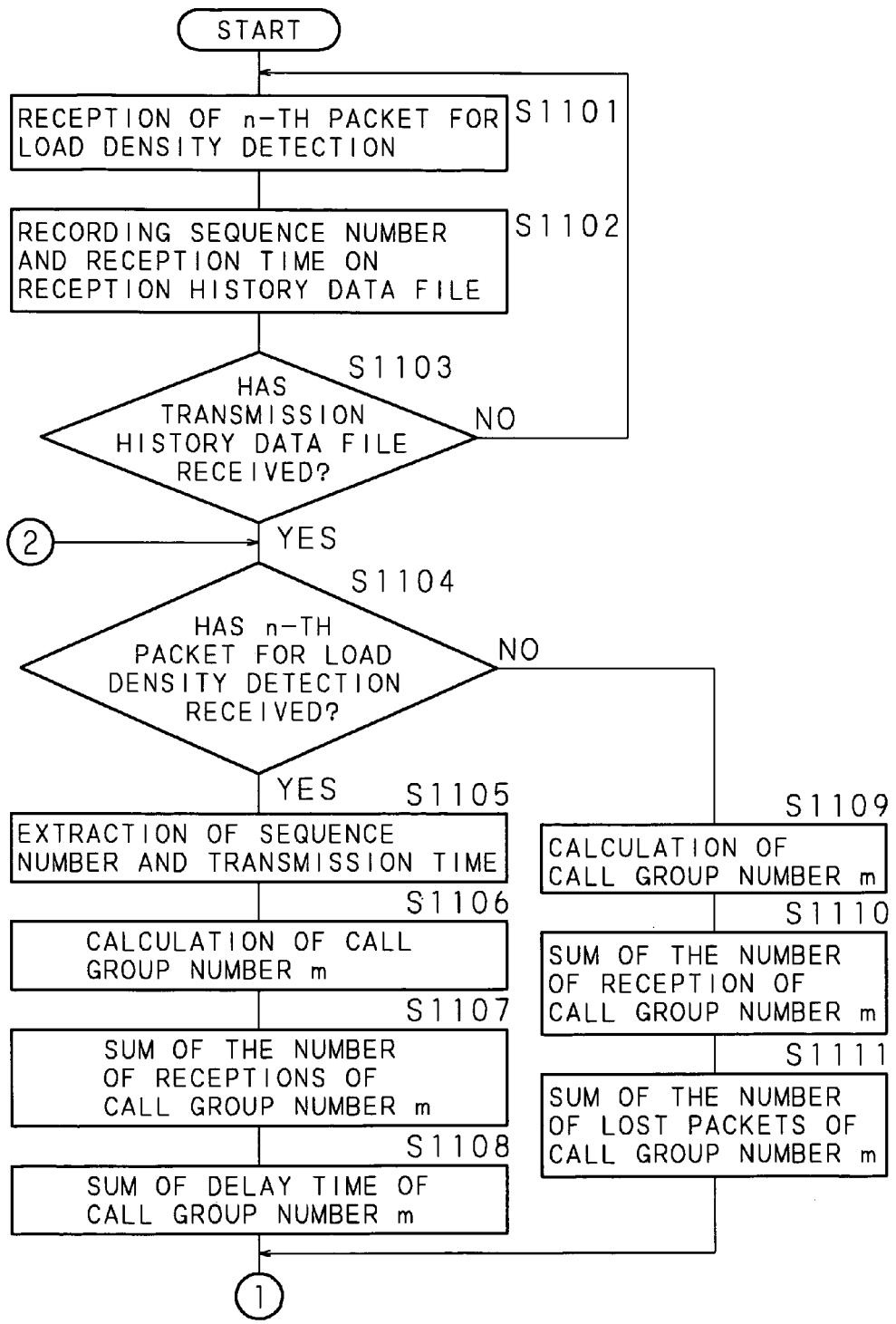
FIG. 11 is a flow chart illustrating a procedure of a control means of a receiver for use in the traffic load density measuring system in accordance with the second embodiment of the present invention.
Figure 12:
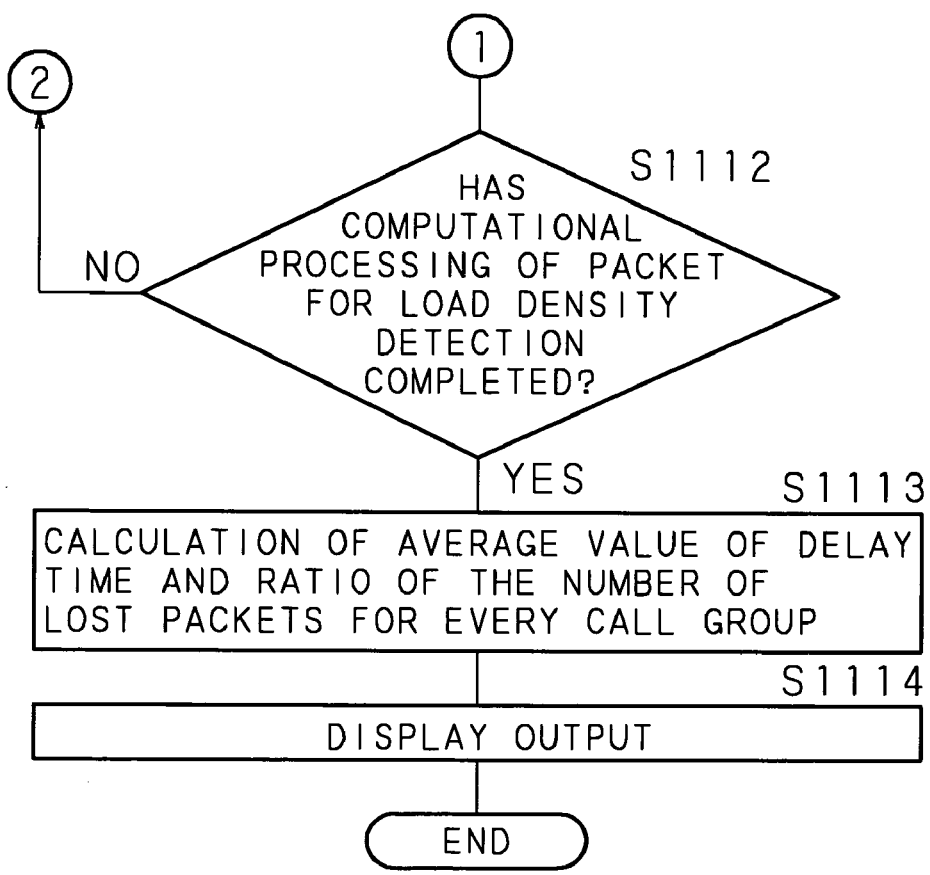
FIG. 12 is a flow chart illustrating the procedure of the control means of the receiver for use in the traffic load density measuring system in accordance with the second embodiment of the present invention.

The receiver 2, by determining whether or not the packet for traffic load density detection transmitted at the aforementioned timing is greatly delayed, or is received without being lost, can determine the amount of the communication traffic at the transmission timing. FIG. 11 and FIG. 12 are flow charts illustrating the procedure of the control means 21 of the receiver 2 for use in the traffic load density measuring system in accordance with the second embodiment of the present invention.

First, the control means 21 of the receiver 2 receives the n-th packet for load density detection transmitted from the transmitter 1 (Step S1101), and records the sequence number and the reception time of the packet for load density detection on the reception history data file in which the reception history of the packets is stored (Step S1102). The control means 21 determines whether or not the reception history data file has been received (Step S1103), and if determining that it has not been received yet (Step S1103: NO), the control means 21 returns the procedure to Step S1101 to continue the usual receiving processing. If the control means 21 determines that it has received (Step S1103: YES), the control means 21 references the reception history data file to determine whether or not the n-th packet for load density detection having the sequence number n has been received (Step S1104). If the control means 21 determines that the n-th packet for load density detection has been received (Step S1104: YES), The control means 21 extracts the sequence number and the transmission time of the n-th packet from the transmission history data file received from the transmitter 1 (Step S1105).

The control means 21 calculates the call group number m (m is a natural number) (Step S1106). Here the call group means what number of the time interval it is when the time interval of the transmission interval of the VoIP packet Ts is equally divided by M (M is a natural number), and the call group number is a number m (m is a natural number: m≦M) which indicates what number of the call groups a sampling position belongs to when the load density detection of a plurality of points in the transmission interval of the VoIP packet Ts is performed by the probing. The call group number m is worked out as an integral part of the remainder obtained by dividing a difference between a time stamp TS (n) of the header item of the n-th packet for load density detection, and an initial value TS (1) by the transmission interval Ts of the VoIP packet. That is, it is worked out based on equation (1) in a manner similar to the first embodiment.

The control means 21 sums the number of receptions of the call group number m (Step S1107), and sums the delay time of the call group number m (Step S1108). The delay time is calculated as a relative delay time of the reception time with respect to the extracted transmission time. Incidentally, needless to say, the transmission time is acquired from the transmission history data file, and the reception time is acquired from the reception history data file.

If the control means 21 determines that the n-th packet for load density detection has not been received from the reception history data file yet (Step S1104: NO), the control means 21 calculates the call group number m (m is a natural number) (Step S1109). The call group number m is worked out as an integral part of the remainder obtained by dividing a difference between a time stamp TS (n) of the header item of the n-th packet for load density detection, and an initial value TS (1) by the transmission interval Ts of the VoIP packet. That is, it is worked out based on equation (1) in a manner similar to the first embodiment.

The control means 21 sums the number of receptions of the call group number m (Step S1110), and sums the number of lost packets of the call group number m (Step S1111).

The control means 21 determines whether or not the computational processing of the packet for load density detection of the number of receptions being sufficient for evaluating quality for every call group, for example, 500 receptions has been completed (Step S1112). If the control means 21 determines that the computational processing of the packet for load density detection has not been completed yet (Step S1112: NO), the control means 21 returns the procedure to Step S1104 to repeat the aforementioned procedure. If the control means 21 determines that the computational processing of the packet for load density detection has been completed (Step S1112: YES), the control means 21 calculates the average value of the delay time and a ratio of the number of lost packets for every call group (Step S1113), and outputs and displays the calculated result through the output means 18 (Step S1114).

As described above, according to the second embodiment, it is not necessary to additionally provide an expensive capturing device, the communication traffic required for measuring the traffic load density is almost the same as, for example, one VoIP call, a significant reduction in communication traffic can be achieved as compared with the conventional method which requires a plurality of probings.

Note herein that in the aforementioned first and second embodiments, the transmission time of the packet is set to the time stamp of RTP of the packet for load density detection. According to the RTP rule, when the transmission packet is a voice packet complied with G.711, a unit of time for counting 8000 times per second is set, but in order to improve the measurement accuracy of traffic load density, a time having units of microsecond may be set. Additionally, there is a case that respective clocks at both terminals of a transmitting side and a receiving side are shifted little in time due to variation in accuracy of the clock means 26, leading to deterioration of the measurement accuracy. In this case, in order to improve the measurement accuracy of the traffic load density, a constant correction time may be added to or subtracted from the reception time of the packet for load detection whenever the terminal at the receiving side receives the measurement packet to thereby relax an influence due to the variation in accuracy of the clock means 26. Moreover, a time lag may arise during from setting the transmission time to the time stamp until the packet is actually transmitted to the network. Accordingly, in order to further improve measurement accuracy, it may be configured in such a way that a j-th adjusted value, which is a difference between a transmission time recorded on a time stamp of a j-th measurement packet and a time when the j-th measurement packet is actually transmitted to the network, is recorded on a (j+1)th payload portion of RTP or the like to be transmitted, and at a time of receiving the (j+1)th packet for load density detection at the receiving side, the time when the j-th packet for load density detection is actually transmitted to the network is corrected base on the recorded j-th adjusted value to thereby to improve the measurement accuracy. The time when the packet for load density detection is actually transmitted may be acquired using a function of the communication means 25. As one of the specific examples thereof, it can be acquired using a function of a network processing program product called libpcap.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A traffic load density measuring system measuring traffic load density, comprising:
    a transmitter connected to a communication network for transmitting a packet; and
    a receiver connected to the communication network for receiving the packet, and
    wherein the transmitter comprises:
        a communication interval acquiring unit that acquires a communication interval of the packet for communication;
        a detection packet transmission unit that transmits a packet for load density detection at a predetermined transmission interval, in which the transmitted packet for load density detection is provided with transmission information capable of specifying a transmission time, the transmission interval, and a transmission number of the packet for load density detection; and
        an interval change unit that sets the transmission interval to be a different interval from the communication interval, and
    the receiver comprises:
        a reception unit that receives the packet for load density detection;
        an extraction unit that extracts said transmission information from the packet for load density detection being received; and
        a measurement unit that measures the traffic load density based on the extracted transmission information, and a delay or lost status of the packet for load density detection.

2. The traffic load density measuring system according to claim 1, wherein the interval change unit changes the transmission interval of said packet for load density detection so that a ratio of the transmission interval of said packet for load density detection to the predetermined transmission interval may become smaller than an upper limit.

3. The traffic load density measuring system according to claim 1, wherein the interval change unit adds or subtracts a time randomly generated to or from the predetermined transmission interval to change the transmission interval of said packet for load density detection.

4. The traffic load density measuring system according to claim 2, wherein the interval change unit adds or subtracts a time randomly generated to or from the predetermined transmission interval to change the transmission interval of said packet for load density detection.

5. A traffic load density measuring system measuring traffic load density, comprising:
   a transmitter connected to a communication network for transmitting a packet, and
   a receiver connected to the communication network for receiving the packet, and
   wherein the transmitter comprises:
      a communication interval acquiring unit that acquires a communication interval of the packet for communication;
      a detection packet transmission unit that transmits a packet for load density detection at a predetermined transmission interval, in which the transmitted packet for load density detection is provided with transmission information capable of specifying a transmission time, the transmission interval, and a transmission number of the packet for load density detection; and
      an interval change unit that sets the transmission interval of to be a different interval from the communication interval; and
   the receiver comprises:
      a reception unit that receives the packet for load density detection and a data file corresponding to information for specifying the packet for load density detection;
      an extraction unit that extracts said transmission information from the packet for load density detection being received including based on the data file; and
      a measurement unit that measures the traffic load density based on the extracted transmission information, and a delay or lost status of the packet for load density detection.

6. A traffic load density measuring system measuring traffic load density, comprising:
   a transmitter including a first communication unit connected to a communication network for transmitting a packet, and
   a receiver including a second communication unit connected to the communication network for receiving the packet
   wherein the transmitter comprises a processor capable of performing operations including:
      acquiring a communication interval of the packet for communication;
      transmitting a packet for load density detection at a predetermined transmission interval, in which the transmitted packet for load density detection is provided with transmission information capable of specifying a transmission time, the transmission interval, and a transmission number of the packet for load density detection; and
      changing the transmission interval to be a different interval from the communication interval;
   the receiver comprises a processor capable of performing operations including:
      receiving said packet for load density detection;
      extracting said transmission information from said packet for load density detection being received; and
      measuring the traffic load density within based on the extracted transmission information, and a delay or a lost status of the packet for load density detection.

7. The traffic load density measuring system according to claim 6, wherein the transmitter comprises the processor further capable of performing an operation including:
   changing the transmission interval of said packet for load density detection so that a ratio of the transmission interval of said packet for load density detection to the predetermined transmission interval may become smaller than an upper limit.

8. The traffic load density measuring system according to claim 6, wherein the transmitter comprises the processor further capable of performing an operation including:
   adding or subtracting a time randomly generated to or from the predetermined transmission interval to change the transmission interval of said packet for load density detection.

9. The traffic load density measuring system according to claim 7, wherein the transmitter comprises the processor further capable of performing an operation including:
   adding or subtracting a time randomly generated to or from the predetermined transmission interval to change the transmission interval of said packet for load density detection.

10. A traffic load density measuring system measuring traffic load density, comprising:
   a transmitter including a first communication unit connected to a communication network for transmitting a packet, and
   a receiver including a second communication unit connected to the communication network for receiving the packet
   wherein the transmitter comprises a processor capable of performing operations including:
      acquiring a communication interval of the packet for communication;
      transmitting a packet for load density detection at a predetermined transmission interval, in which the transmitted packet for load density detection is provided with transmission information capable of specifying a transmission time, the transmission interval, and a transmission number of the packet for load density detection; and
      changing a transmission interval to be a different interval from the communication interval;
      storing the transmission information into a data file associating with information for specifying said packet for load density detection; and
      transmitting said packet for load density detection and said data file to said first communication unit, and
   the receiver comprises a processor capable of performing operations including:
      receiving said packet for load density detection and said data file from said second communication unit;
      extracting said transmission information from said data file being received; and
      measuring the traffic load density based on the extracted transmission information, and a delay or a lost status of said packet for load density detection.

11. Traffic load density measuring method, using a transmitter connected to a communication network for transmitting a packet, and a receiver for receiving the packet via the communication network, in which a packet for load density detection is transmitted and received to measure a traffic load density, wherein the method comprising:

acquiring a communication interval of a packet for communication;

transmitting a packet for load density detection at a predetermined transmission interval, in which the transmitted packet for load density detection is provided with transmission information capable of specifying a transmission time, the transmission interval, and a transmission number of the packet for load density detection; and changing the transmission interval to be a different interval from the communication interval;

receiving said packet for load density detection;

extracting said transmission information from said packet for load density detection being received; and measuring the traffic load density on the extracted transmission information, and a delay or a lost status of said packet for load density detection.

12. Traffic load density measuring method, using a transmitter connected to a communication network for transmitting a packet, and a receiver for receiving the packet via the communication network, in which a packet for load density detection is transmitted and received to measure a traffic load density, the method comprising:

acquiring a communication interval of a packet for communication;

transmitting a packet for load density detection at a predetermined transmission interval, in which the transmitted packet for load density detection is provided with transmission information capable of specifying a transmission time, the transmission interval, and a transmission number of the packet for load density detection; and changing a transmission interval of said packet for load density detection to be a different interval from the communication interval;

storing the transmission information into a data file associating with information for specifying said packet for load density detection;

transmitting said packet for load density detection and said data file;

receiving said packet for load density detection and said data file;

extracting said transmission information from said data file being received; and measuring the traffic load density based on the extracted transmission information, and a delay or a lost status of said packet for load density detection.

13. A transmitter in which the transmitter is connected to a communication network via a communication means, and transmits a packet within a predetermined transmission interval to a receiver to measure a traffic load density, wherein the transmitter comprises:

a communication interval acquiring unit that acquires a communication interval of the packet for communication;

a detection packet transmission unit that transmits a packet for load density detection at a predetermined transmission interval, in which the transmitted packet for load density detection is provided with transmission information capable of specifying a transmission time, the transmission interval, and a transmission number of the packet for load density detection; and an interval change unit that sets the transmission interval to be a different interval from the communication interval; and a transmission unit that transmits said packet with the transmission information, and where the traffic load density is measured based on the transmission information extracted from the packet for load density detection, and a delay or lost status of the packet for load density detection.

14. A transmitter in which the transmitter is connected to a communication network via a communication means, and measures a traffic load density within a predetermined transmission interval to a receiver, wherein the transmitter comprises a processor capable of executing an operation comprising:

acquiring a communication interval of a packet for communication;

transmitting a packet for load density detection at a predetermined transmission interval, in which the transmitted packet for load density detection is provided with transmission information capable of specifying a transmission time, the transmission interval, and a transmission number of the packet for load density detection; and changing the transmission interval of said packet for load density detection to be a different interval from the communication interval; and where the traffic load density is measured based on the transmission information extracted from the packet for load density detection, and a delay or lost status of the packet for load density detection.

15. A receiver in which the receiver is connected to a communication network via a communication means, and measures a traffic load density within a predetermined transmission interval, wherein the receiver comprises:

a reception unit that receives a packet for load density detection at a predetermined transmission interval, in which the transmitted packet for load density detection includes transmission information capable of specifying a transmission time, a transmission interval, and a transmission number of the packet for load density detection;

an extraction unit that extracts said transmission information from said packet for load density detection received, the transmission interval of said packet for load density detection being changed to be a different interval from the communication interval; and a measurement unit that measures the traffic load density based on the extracted transmission information, and a delay or lost status of the packet for load density detection.

16. A receiver in which the receiver is connected to a communication network, and measures a traffic load density within a predetermined transmission interval, wherein the receiver comprises a processor capable of executing an operation comprising:

receiving a packet for load density detection at a predetermined transmission interval, in which the transmitted packet for load density detection includes transmission information capable of specifying a transmission time, a transmission interval, and a transmission number of the packet for load density detection;

extracting said transmission information from said packet for load density detection received, the transmission interval of said packet for load density detection being changed to be a different interval from the communication interval; and measuring the traffic load density based on the extracted transmission information, and a delay or a lost status of said packet for load density detection.

17. A traffic load density measuring system comprising:

a transmitter connected to a communication network for transmitting a packet; and a receiver connected to the communication network for receiving the packet, in which a packet for load density detection is transmitted and received to measure a traffic load density within a predetermined transmission interval, wherein the transmitter comprises
- an interval change means for changing a transmission interval of said packet for load density detection; and
- a transmission means for transmitting said packet with adding transmission information capable of specifying a transmission time, a transmission interval, and a transmission number of said packet for load density detection to said packet for load density detection, and the receiver comprises
- a reception means for receiving said packet for load density detection;
- an extraction means for extracting said transmission information from said packet for load density detection being received; and
- a measurement means for measuring the traffic load density within the predetermined transmission interval based on the extracted transmission information, and a delay or lost status of said packet for load density detection, wherein the interval change means adds or subtracts a time randomly generated to or from the predetermined transmission interval to change the transmission interval of said packet for load density detection.

18. A traffic load density measuring system comprising a transmitter including a first communication means connected to a communication network for transmitting a packet, and a receiver including a second communication means connected to the communication network for receiving the packet, in which a packet for load density detection is transmitted and received to measure a traffic load density within a predetermined transmission interval, wherein the transmitter comprises a processor capable for performing the steps of:
- changing a transmission interval of said packet for load density detection; and
- transmitting the packet to said first communication means with adding transmission information capable of specifying a transmission time, a transmission interval, and a transmission number of said packet for load density detection to said packet for load density detection, the receiver comprises a processor capable for performing the steps of:
- receiving said packet for load density detection from said second communication means;
- extracting said transmission information from said packet for load density detection being received; and
- measuring the traffic load density within the predetermined transmission interval based on the extracted transmission information, and a delay or a lost status of said packet for load density detection, and wherein the transmitter comprises the processor further capable for performing the step of:
- adding or subtracting a time randomly generated to or from the predetermined transmission interval to change the transmission interval of said packet for load density detection.

* * * * *

UNITED STATES PATENT AND TRADEMARK OFFICE
CERTIFICATE OF CORRECTION

PATENT NO.         : 7,864,695 B2                                    Page 1 of 1
APPLICATION NO.    : 11/447193
DATED              : January 4, 2011
INVENTOR(S)        : Masanobu Morinaga et al.

It is certified that error appears in the above-identified patent and that said Letters Patent is hereby corrected as shown below:

Column 17, Line 29 in Claim 5, before "to be" delete "of".

Column 19, Line 14 in Claim 11, after "density" insert -- based --.

Signed and Sealed this
Nineteenth Day of April, 2011

David J. Kappos
*Director of the United States Patent and Trademark Office*